Aug. 8, 1933.  E. B. FOOTE ET AL  1,921,741
APPARATUS FOR CONTROLLING INDUSTRIAL PROCESSES
Filed June 26, 1930  3 Sheets-Sheet 1
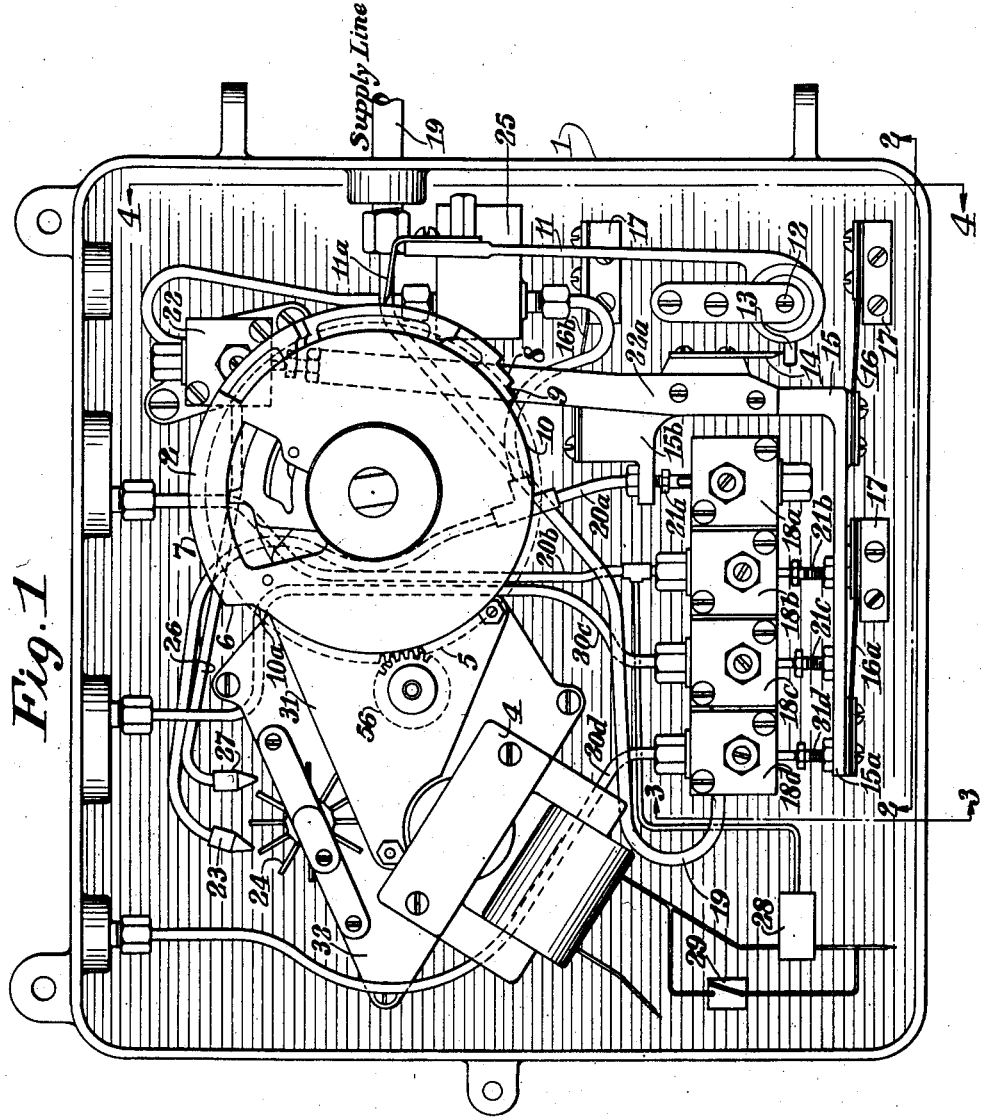
INVENTOR:
Edward B. Foote
Floyd B. Newell
BY
ATTORNEY

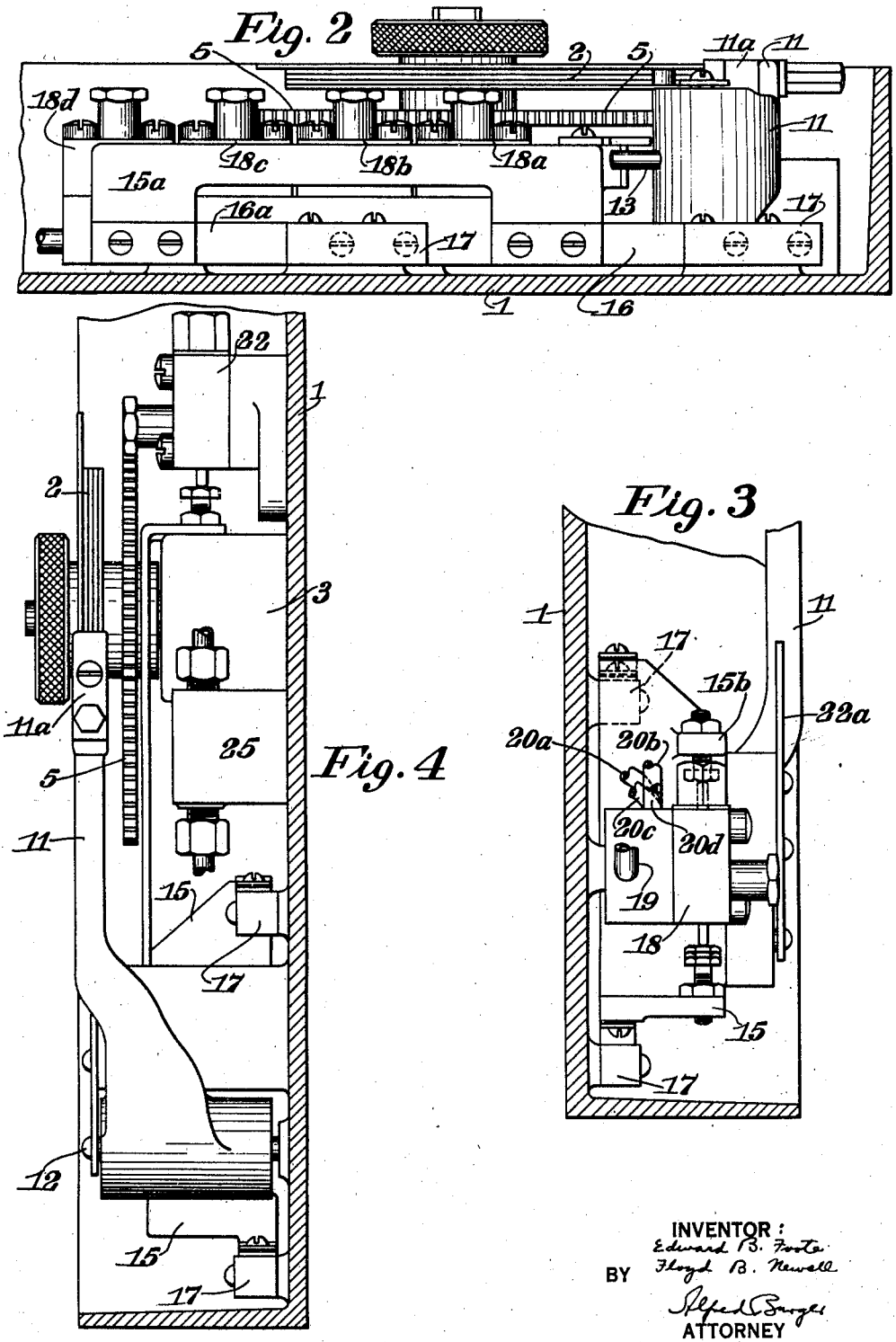

Aug. 8, 1933.　　　E. B. FOOTE ET AL　　　1,921,741
APPARATUS FOR CONTROLLING INDUSTRIAL PROCESSES
Filed June 26, 1930　　　3 Sheets-Sheet 3
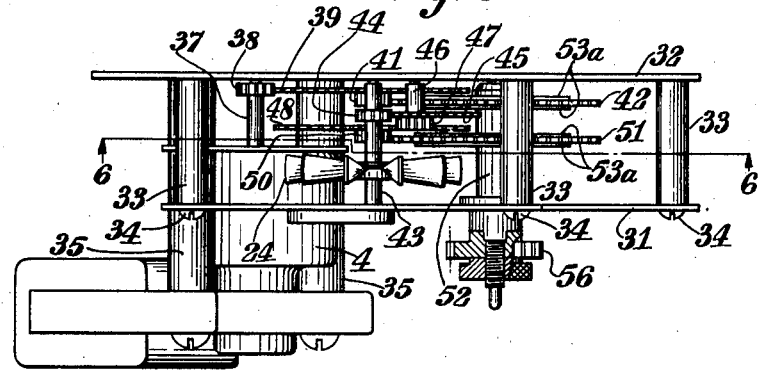
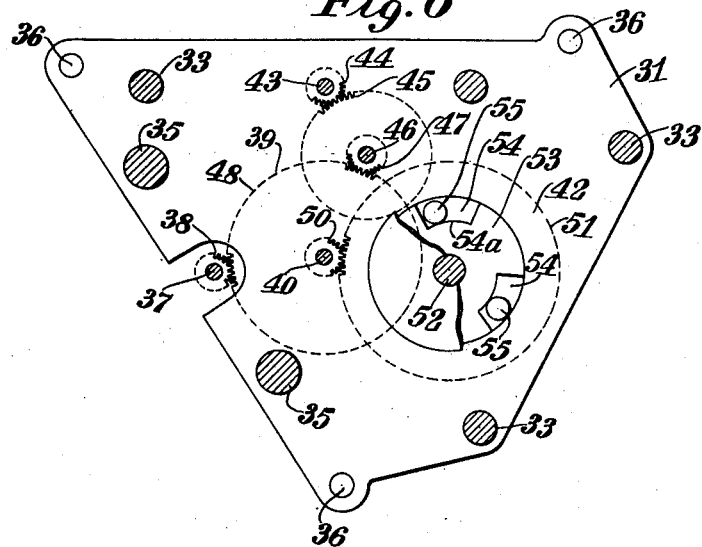
INVENTOR:
Edward B. Foote
Floyd B. Newell
BY
Stephen␣Burger
ATTORNEY Patented Aug. 8, 1933

1,921,741

UNITED STATES PATENT OFFICE 1,921,741

APPARATUS FOR CONTROLLING INDUSTRIAL PROCESSES

Edward B. Foote and Floyd B. Newell, Rochester, N. Y., assignors to Taylor Instrument Companies, Rochester, N. Y., a Corporation of New York Application June 26, 1930. Serial No. 464,100

11 Claims. (Cl. 161—1)

This invention relates to apparatus for controlling industrial processes.

The principal object of the invention is the provision of mechanism which may be readily compounded and adapted for the control of any desired cycle of operation.

Another object is the provision of mechanism which reduces the human factor to an irreduceable minimum.

The invention, the principle of operation on which it is based, the construction, its function and its advantages may be understood from the specification in connection with the accompanying drawings, wherein Fig. 1 is a front view of an instrument containing control mechanism;

Fig. 2 is an enlarged sectional view taken substantially on line 2—2, Fig. 1;

Fig. 3 is an enlarged sectional view taken substantially on line 3—3, Fig. 1;

Fig. 4 is an enlarged sectional view taken substantially on line 4—4, Fig. 1;

Fig. 5 is a plan view of a detail forming part of the invention; and

Fig. 6 is a section on line 6—6, Fig. 5.

Having reference to Fig. 1, 1 represents the instrument casing of which the front part or cover is removed to show the mechanism within.

The operating mechanism includes chiefly a cam 2 whose shaft is mounted in the hub 3 Fig. 4. The cam may be driven by any suitable motor whose speed may be substantially constant, but we prefer a synchronous motor 4 built for a frequency available at the point of application of the instrument, which is usually the commercial frequency of sixty cycles. The motion of the synchronous motor 4 is transmitted to the shaft of the cam by a reducing gear train driving the large gear 5 on the cam shaft, as will be more fully described in connection with Figs. 5 and 6. The cam 2 has along its periphery a plurality of stepped surfaces starting with the inclined portion 6, the extended surface 7 and short surfaces 8, 9 and another extended portion 10 of smallest radius curvature, the portion 10 terminating in a slight incline 10a which connects up to the incline 6. The cam cooperates with the follower 11 through the contact finger 11a. The follower 11 is mounted at 12 and carries a short arm 13 constituting with the follower a bell crank lever.

The arm 13 supports a plate 14 which is part of a frame 15 which includes at the bottom a relatively long arm 15a and at the top a short arm 15b. The frame 15 is normally maintained in a fixed position by means of leaf springs 16, attached at one end to blocks 17 and secured at the other end to the frame 15. The leaf springs are of the same length so that all points of the frame have straight-line motion in vertical direction. The leaf springs are in effect a convenient type of parallel-motion mechanism. Between the arms 15a and 15b is mounted a series of air valves 18a, 18b, 18c and 18d of a well known construction for individually controlling the flow of compressed air from the supply line 19 to the different service lines 20a, 20b, 20c and 20d. While the particular purpose of these service lines does not have any special relationship to the invention proper and may be used for the control of various forms of mechanism, line 20a in the particular instance is used for the operation of mechanism to be more fully described and lines 20b, 20c and 20d may be assumed to operate diaphragm valves for controlling the operation of a vulcanizing press or the like. The valve stems of the valves 18b, 18c and 18d extend downwardly and are acted upon by adjustable abutments 21b, 21c and 21d on arm 15a while the valve stem of the valve 18a extends upwardly and is acted upon by the adjustable abutment 21a on arm 15b. The abutments 21b, 21c and 21d actuate the corresponding valve stems when the frame 15 is moved upwardly while the abutment 21a actuates the stem of valve 18a when the frame 15 moves downwardly. By means of the adjustable abutments a differential setting can be so made as to actuate the different valves at different times.

The valve 18a, in the particular instance, controls the flow of the air to a nozzle 23 which is directed against an impulse wheel 24. Valve 18a is opened when the contact finger 11a of the follower 11 drops from the cam surface 9 down upon the surface 10 and a stream of air from the nozzle 23 causes the wheel 24 to rapidly turn, thereby causing the cam 2 to quickly rotate until the contact finger rides up the short incline 10a. When the finger 11a reaches about the uppermost point of the incline 10a, the frame 15 has been raised sufficiently so that the arm 15b has released the stem valve of valve 18a and has allowed the latter to close. Just when the valve 18a is about to close, an additional valve 22 is operated by means of arm 22a, which is attached to the frame 15, and allows air from a tank 25 to flow through conduit 26 to nozzle 27. Nozzle 27 is directed against wheel 24 so as to be in opposition to the nozzle 23. The arrangement including tank 25, valve 22 and nozzle 27 is in substance a brake mechanism for stopping wheel 24 when the contact finger 11a has about reached the top of incline 10a.

Tank 25, which is just large enough to contain a sufficient volume of air to stop the wheel 24, is connected to the conduit 20a and is filled while the valve 18a is open, a check valve in the connection preventing return flow of the compression fluid.

Having reference to Figs. 5 and 6, the two plates 31 and 32 together with spacers 33 and screws 34 form a frame for mounting a composite gear train for transmitting motion from both the synchronous motor 4 and the impulse wheel 24 to the gear 5 driving the cam 2. The motor 4 is attached to the plate 32 by means of studs 35 and the mechanism as a whole may be secured to the back of the casing 1 by means of holes 36 and corresponding screws.

The shaft 37 of the motor 4 carries at its end a pinion 38 in mesh with a gear 39 to which is secured a pinion 41 which in turn is in mesh with the gear 42.

The shaft 43 of the impulse wheel 24 carries a pinion 44 in mesh with a gear 45 on the shaft 46 on which is mounted a pinion 47 which, in turn, is in engagement with a gear 48. To the latter is secured a pinion 50 which is in mesh with a gear 51.

The gears 39 and 48 together with their pinions 41 and 50 respectively, are mounted for rotation on a shaft 40. The gears 42 and 51 are both secured to the drive shaft 52 by means of clutch mechanism comprising central disks 53 having each in its periphery recesses 54 the bottoms 54a of which are non-concentric to the shaft 52 and constitute cam surfaces. The gears 42 and 51 are free to rotate on the disks 53 as hubs but for the action of balls 55 which prevent rotation of the gears in one direction relatively to the shaft 52 which is secured to the disks 53. The balls are held in place by cover disks 53a.

While the motor 4 is in operation, the motion of the transmission mechanism including gear 42 is such that the clutch mechanism drives shaft 52. Similarly while the impulse wheel 24 is in operation, the motion of the transmission mechanism including the gear 51 is such that the clutch mechanism drives the shaft 52 in the same direction as before. While one of the gears 42, 51 drives the shaft 52, the other gear remains stationary.

The shaft 52 carries at its outer end a gear 56 for connection with the gear 5.

When the contact finger 11a drops from the cam surface 7 upon surfaces 8 and 9 and finally upon surface 10, the frame 15 is gradually lowered, as previously described. The arm 15b together with abutment 21a thereby gradually approaches the stem of the valve 18a. Only when the contact finger 11a drops from the surface 9 upon the surface 10, the valve 18a is operated to allow air to flow from the supply line 19 to the line 20a which, as previously explained, conducts the air to the tank 25 and to the nozzle 23.

Thus the impulse wheel is set into operation when the motor 4 is stopped. The rotation of the impulse wheel 24 continues until the finger 11a has been raised by the cam surface section 10a to cause the operation of the valve 22 by the arm 22a and at the same time allow the valve 18a to close again. The discharge of the air contained in the tank 25 and controlled by valve 22 to the nozzle 27 continues just long enough to stop the impulse wheel 24 at the proper point relatively to the position of the contact finger 11a on the cam.

The synchronous motor 4 and the wheel 24 are independent of each other.

The synchronous motor 4 may be controlled by a pneumatic switch 28 which is connected to one of the conduits 20b, 20c, 20d of that valve which closes last as the contact finger 11a drops from the surface 9 down to the surface 10. In the particular instance the switch 28 is connected to the conduit 20b. When the valve 18b is closed so that no air flows into conduit 20b, the switch 28 opens and breaks the circuit of the motor 4. To start the cycle of operation, the synchronous motor may be started by means of a switch preferably a push button switch 29 shunting the pneumatic switch 28. As soon as the contact finger 11a has started up the inclined surface 6, the valve 18b is opened and the pneumatic switch 28 is operated to close the circuit of the motor, when the push button can be released without opening the circuit.

The only manual operation to be performed is pushing the button 29. Thereupon the motor starts to turn the cam 2, successively operating valves 18b, 18c and 18d which in turn cause the operation of industrial apparatus. When finally the follower 11a successively drops from the cam face 7 to the step surfaces 8 and 9 and then upon the surface 10, the valves 18d, 18c and 18b are again operated to terminate the industrial operation and the impulse motor 24 is operated to quickly bring the cam again to the starting position, when the mechanism is automatically stopped. Then after the necessary preparation is made for performing another cycle, the actuation of the push button is again the only manual work to be done to carry out the new cycle of operation.

The cam, which forms the principal element of a time-cycle regulator of the type described, and the correlated mechanism do not specifically form a part of the invention. The invention proper comprises the particular means described for quickly resetting the cam 2, after an industrial cycle has been completed, to a definite initial position. In instruments of the type involved compressed air is generally used for the operation of diaphragm valves which in turn control the flow of a fluid medium such as steam or other media, in accordance with a definite time schedule represented by the cam.

In the particular arrangement described, the cycle of operation for carrying out an industrial process is assumed to be terminated when the follower reaches the end of surface 7. The motor 4 which is in substance a time piece has performed its function to drive the cam and now the cam must be returned to its starting position at the foot of the incline 6 and this operation is carried out by the impulse wheel 24 under the action of nozzle 23, while the nozzle 27 stops the impulse wheel when the cam has reached its starting position. The cam, the surface of which is primarily shaped to actuate valves 18b, 18c and 18d for carrying out an industrial process in accordance with a definite time schedule, is additionally shaped, as described, for the actuation of the resetting mechanism.

The resetting device described has been chosen because of its simplicity, since compressed air is available at the very instrument and the mechanism for transmitting the motion may be readily correlated to the mechanism for transmitting the motion from the motor 4.

We claim:

1. In apparatus of the character described, the combination of a cam, a motor for driving the cam, an impulse wheel for driving the cam, means for independently transmitting motion from the said motor and from the wheel to the cam, means operatively connected with the motor for controlling the motor, and means operatively connected with the cam for controlling the wheel.

2. In apparatus of the character described, the combination of a cam, a motor for driving the cam, an impulse wheel for driving the cam, means for independently transmitting motion from the said motor and from the wheel to the cam, means for energizing the said motor, means for energizing the wheel, means for manually controlling the motor-energizing means, means operatively connected with the cam for automatically controlling the motor-energizing means and means operatively connected with the cam for automatically controlling the wheel energizing means.

3. In apparatus of the character described, the combination of a cam, mechanism for driving the cam from a definite starting point through a definite angle less than one revolution and means operatively connected with the cam for independently driving the cam through the remaining part of one revolution.

4. In apparatus of the character described, the combination of a cam, mechanism for driving the cam from a definite starting point through a definite angle less than one revolution and means operatively connected with the cam for independently driving the cam through the remaining part of one revolution, comprising an impulse wheel, means for energizing the wheel, means responsive to the motion of the cam for making the said energizing means effective and means responsive to the motion of the cam for making the energizing means ineffective.

5. In apparatus of the character described, the combination of a cam, mechanism for driving the cam from a definite starting point through a definite angle less than one revolution, and means for independently driving the cam at a considerably faster rate through the remaining part of one revolution, including means operatively connected with the cam for making the said mechanism ineffective, means operatively connected with the cam for making the independent driving means effective and means operatively connected with the cam for making the independent driving means ineffective when said starting position is reached.

6. In apparatus of the character described, the combination of a cam, mechanism for driving the cam from a definite starting point through a definite angle less than one revolution, and means for independently driving the cam at a considerably faster rate through the remaining part of one revolution, including means operatively connected with the cam for making the said mechanism ineffective, means operatively connected with the cam for making the independent driving means effective and means operatively connected with the cam for making the independent driving means ineffective substantially when said starting position is reached and means for positively stopping said independent driving means when said starting position is reached.

7. In apparatus of the character described, the combination of a cam, a primary mechanism for driving the cam at a definite rate, a second mechanism for driving the cam at a different rate, means for energizing the primary mechanism, means for energizing the second mechanism, means operatively connected with the cam for controlling the energizing means of the primary mechanism and means operatively connected with the cam for controlling the energizing means of the second mechanism.

8. In apparatus of the character described, the combination of a cam, a primary mechanism for driving the cam at a definite rate, a second mechanism for driving the cam at a different rate, means for energizing the primary mechanism, means for energizing the second mechanism, means operatively connected with the cam for controlling the energizing means of the primary mechanism, means operatively connected with the cam for controlling the energizing means of the second mechanism and means for manually controlling the energizing means of the primary mechanism.

9. In apparatus of the character described, the combination of a cam, an impulse wheel, a pressure fluid conduit for energizing the wheel, means for transmitting motion from the wheel to the cam, means operatively connected with the cam for controlling the energizing means to drive the cam through a predetermined part of one revolution.

10. In apparatus of the character described, the combination of a cam, an impulse wheel, a pressure-fluid conduit for energizing the wheel, means for transmitting motion from the wheel to the cam, means operatively connected with the cam for making the energizing means effective, means operatively connected with the cam for making the energizing means ineffective and means operatively connected with the cam for stopping the mechanism when the energizing means is made ineffective.

11. In apparatus of the character described, the combination of a cam, an impulse wheel for driving the cam, a source of pressure fluid, means for directing pressure fluid against the wheel for driving it in one direction, means for directing pressure fluid against the wheel to drive it in opposite direction and means operatively connected with the cam for interdependently controlling said two means.

EDWARD B. FOOTE.
FLOYD B. NEWELL.